Sept. 19, 1961 M. W. FORTH ET AL 3,000,110
BAFFLE PLATES FOR CROP DRIER

Filed June 4, 1958 2 Sheets-Sheet 1

INVENTORS
M. W. FORTH
H. A. FINK
BY
ATTORNEYS

INVENTORS
M. W. FORTH
H. A. FINK
ATTORNEYS

United States Patent Office 3,000,110
Patented Sept. 19, 1961

3,000,110
BAFFLE PLATES FOR CROP DRIER
Murray W. Forth and Harry A. Fink, Jr., Moline, Ill., assignors, by mesne assignments, to Deere & Company, a corporation of Delaware
Filed June 4, 1958, Ser. No. 739,792
8 Claims. (Cl. 34—167)

This invention relates to a crop drier and more particularly to an improvement in a crop drier which provides for constant and even flow of material through the drier so as to cause complete drying of the material while reducing scorching of the material or crop.

The conventional type of crop drier includes therein an air heating element or means with a blower associated therewith for effecting movement of the air into an elongated plenum chamber having perforated walls and which in many instances serves as the inner wall of a large crop drying chamber, which also has an outer wall spaced from the inner or plenum chamber wall. The crop drying chamber is generally vertically disposed and crops are fed in the upper section or portion of the chamber and are permitted to gravitate to a lower conveyor which moves crops outwardly from the crop drier. The walls of the outer wall are perforated and the perforations therein operate in conjunction with the perforations of the plenum chamber to permit the hot air to pass through the crop drying chamber. This, of course, causes the crop to dry as it gravitates.

The crops gravitate in the crop drying chamber generally in a continuous path from the upper portion of the crop drier to the lower conveyor. However, due to the basic shape of the crop drier there will be created pockets of grain in the chamber which are not prone to move in the path and consequently are retained in the crop drying chamber throughout long periods of time. These pockets of grain are created generally by the weight of the grain itself being concentrated in one area of the drying chamber thereby building up a relatively large pressure in that area which prevents the grain from moving. As is obvious the grain will flow in the areas of the least pressure. This condition, of course, causes those portions of the crop which are retained in the drying chamber to become exceedingly dry and in many instances even scorched. Also, since in effect the portion of the drying chamber in which the crop or grain is retained is not being used as a drying chamber, the unit does not obtain its maximum efficiency. Consequently, in many instances the crop will be forced to be recirculated additional times in order to obtain full drying of the grain.

With the above in mind, it is the purpose of the present invention to secure within the crop drying chamber a series of baffles which are formed of perforated wall structure and are in the shape of wedge members having at least one edge in opposed relation to what would be the normal gravitational path of travel to bi-direct the crop on opposite sides of the wedge structure. By suitably placing the baffle members within the crop drying chamber, the flow of grain may be directed generally from the areas of high pressure in the chamber which previously has retained the crops against gravitating and will cause the grain to move into areas of low pressure. By so placing the baffles, the grain will dry evenly and generally in a reduced length of time so that maximum efficiency of the drier may be obtained.

In the above type of drier, the plenum chamber is generally longitudinally disposed with a portion thereof surrounding and overlying the heated area. The portion that overlies the heated area is generally inclined so that grain deposited on the portion will gravitate. Also in this type of drier unless the upper portion of the plenum chamber is covered with grain, the air flowing into the plenum chamber will take the path of least resistance and will move through the perforations in the chamber which is not covered by grain. It is therefore necessary in the conventional type drier to provide feeding mechanisms which will maintain the crop generally at a level above the plenum chamber. However, even in this type of drier, there are times that it would be desirable that the drier be operated when the crop drying chamber is many times as low as 65% full. Normally, when the grain reaches this level, the upper portion of the plenum chamber is uncovered and the drier will be forced to be shut down.

It is therefore an additional purpose of this invention to provide baffle plates serving as additional wall structure spaced from and above the upper portion of the plenum chamber. The plates will be so placed to cause the grain entering the drier to pass between the plates and the overlying section of the plenum chamber. This will cause that portion of the plenum chamber to remain covered even though the drier is in operation at a reduced capacity. Upon the space between the additional wall structure and the upper portion of the plenum chamber being filled, the grain wil then flow over the additional wall structure or plates and will continue to fill the entire crop drying chamber. It should be noted that in many instances the crop or grain will have a considerable volumetric reduction as it begins to dry. Therefore, if the recirculating system is shut down or additional grain is not added while recirculating, the crop will generally be reduced in volume as it dries and while the problem may not exist in the initial phases of drying, as the drying continues, the grain will reach a level in which normally it will uncover the upper portion of the chamber. Further, the additional wall structure, as above explained also has advantage in permitting the crop drier to begin operation when it is only at a very minimum of its capacity and also will permit it to continue in operation when the grain is being unloaded until the grain level has reached its very minimum in filling the space between the additional wall structure or plates and the upper portion of the plenum chamber.

Other objects and advantages of the present invention will become apparent to those skilled in the art as the nature of the invention is better understod from the following description and as illustrated in the accompanying drawings.

FIG. 3 is a perspective view of one of the baffles shown in FIG. 2.

Figure 1:
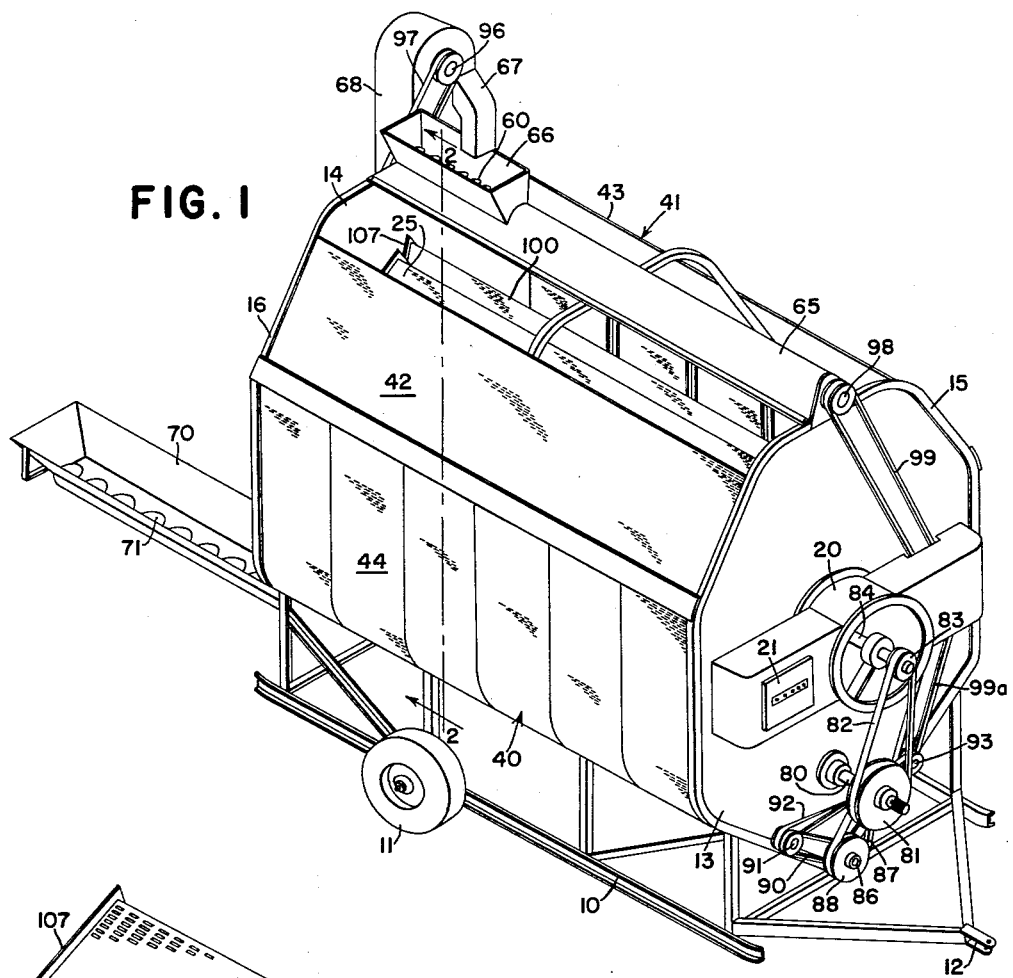
FIG. 1 is a front and side perspective view of a crop drier.

The crop drier herein described includes a main frame 10 supported on a pair of transport wheels, one of which is shown at 11. It is conventional in many driers to permit the wheels to be raised on the frame so as to permit the frame to rest on the ground when not in transport. Details of this nature are not disclosed in the present invention since such is not needed for a full understanding of the invention. The main frame 10 normally is provided with a forwardly positioned clevis 12 for connection to a tractor drawbar, not shown. The drier also includes a pair of longitudinally spaced apart and upwardly extending end walls 13, 14 which are supported on the main frame 10. Suitable angle iron frame work, such as at 15 and 16, extend upwardly from the main frame 10 and provide edge support for the walls 13, 14. Supported in the end wall 13 is a furnace type structure 20 which heats air moving through it. The furnace type structure has blower means therein which draws the air from the outside, blows it through the heating element, and then discharges the heated air internally of the crop drier to provide a central heated area. Positioned adjacent to the furnace structure 20 is a panel board 21, which controls the operation of the furnace. The wall structure includes therein a C-shaped inner wall 25 on the left side of the drier and an inner C-shaped wall 26 on the right side of the drier. The walls 25, 26 are formed to have upwardly inclined surfaces or sections 27, 28 respectively, vertically disposed sides or sections 29, 30 respectively, and downwardly inclined sides or sections 31, 32 respectively. The upper ends of the inclined or diverging sides 27, 28 are connected to form an apex or overlying portion of wall over the heated area. Whether the apex comes to a point, as shown, or is arched would have no bearing so long as the sides are inclined relative thereto. Consequently the term "apex" should indicate only the highest adjoining parts of the inner walls 25, 26. The two inner walls 25, 26 form a plenum chamber in which the warm arm discharged from the furnace 20 will move. The walls 25, 26 are flanged at opposite ends, as indicated at 35, 36 respectively, so as to enable connection to the end walls 13, 14. The exact form of connection is not shown, but connection may be made by bolt, rivets, or by welding. The walls 25, 26 are foraminous or perforated to permit air entering into the plenum chamber to pass outward of the walls.

Figure 2:
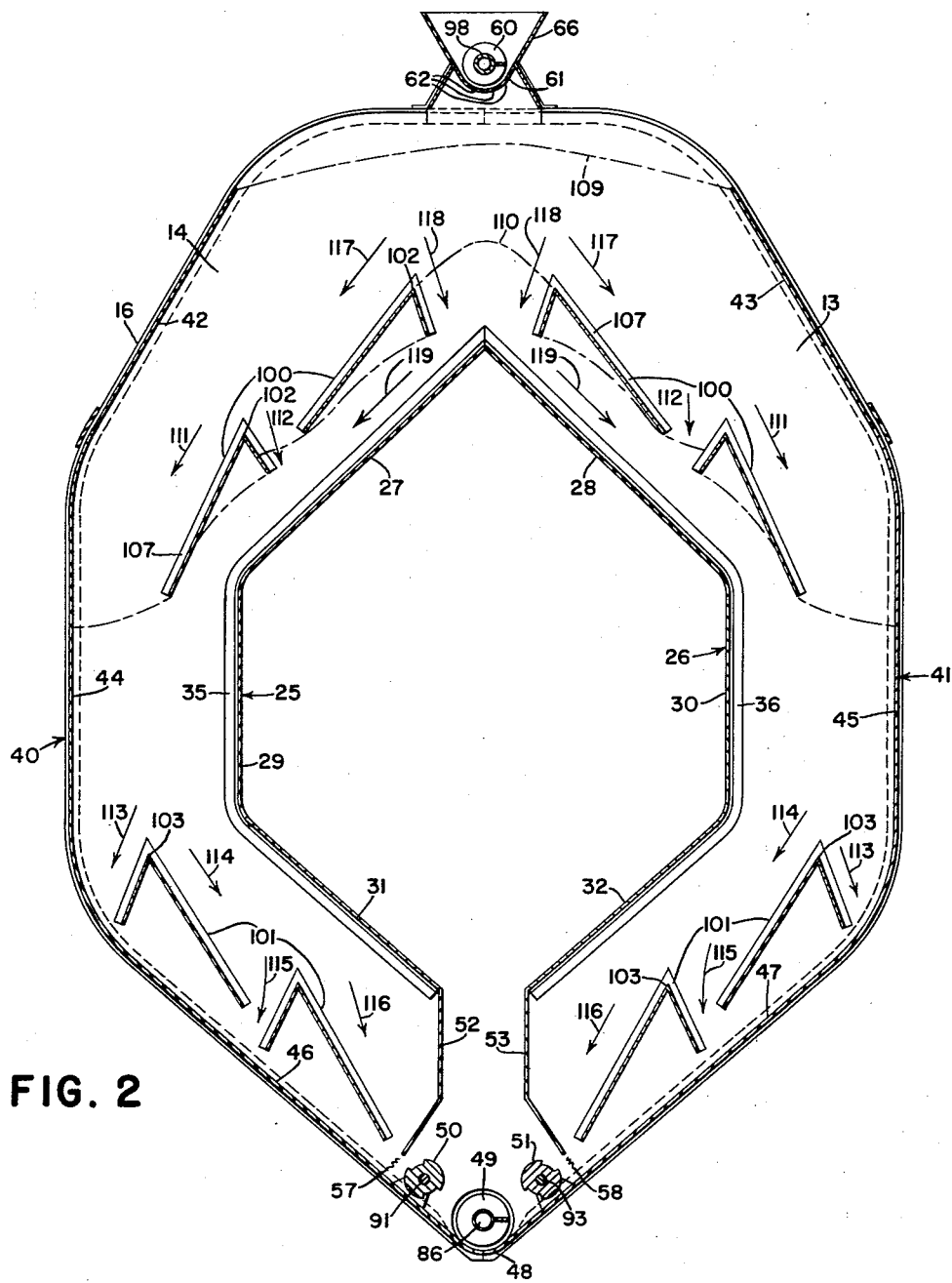
FIG. 2 is a vertical sectional view of the crop drier disclosed in FIG. 1.

Longitudinal outer wall structure extends between the end walls 13, 14 and includes a left outer wall 40 and a right outer wall 41. The outer walls 40, 41 include upwardly inclined sections 42, 43 respectively, upright sections 44, 45 respectively, and lower downwardly inclined sections 46, 47 respectively. As may be seen from viewing FIG. 2, the outer wall sections 42—47 are spaced from and are generally, although not precisely, parallel to the respective wall sections 27—32 of the inner wall structure forming the plenum chamber. The outer walls 40, 41 are also foraminous or perforated to permit air to pass through the walls. As will later become apparent, the wall structures 25, 26 and the outer wall structures 40, 41 form between them a vertically disposed crop drying chamber diverging and converging in inclined relation respectively above and below the central heated area. As may be seen in FIG. 2, the upper edges of the upwardly inclined portion 42, 43, are spaced apart and provide a relatively large opening at the top of the drier. The lower portion of the section 46, 47 at the lower part of the drier is formed in a longitudinal trough 48 supporting a crop discharge auger conveyor 49 which moves the grain from the crop drier. Adjacent to and on opposite sides of the auger 49 are a pair of metering wheels 50, 51 which measures and limits the amount of grain being discharged from the crop drier. Panel structures 52, 53 extend downwardly from the lower edges of the downwardly inclined sections 31, 32 of the plenum chamber walls and have their lower terminal edges spaced from the outer wall sections 46, 47 to form discharge openings 57, 58 for the respective crop drying chambers on the left- and right-hand side of the drier. The openings 57, 58 and metering wheels 50, 51 cooperate with the discharge auger 49 and serve as discharge means for the crop drier. The panels 52, 53, the metering wheels 50, 51, and discharge auger 49 extend the length of the crop drier and are supported at opposite ends by the end walls 13, 14.

Crops are fed to the crop drying chambers by means of an overhead conveyor in the form of an auger 60. The auger 60 is provided with an auger trough 61 extending the length of the drier and is supported on the end walls 13, 14. The trough 61 has a plurality of discharge openings 62 in the base of the trough spaced longitudinally the length of the crop drier and so spaced to permit a relatively even distribution of grain within the crop drying chambers. Mounted over the trough 61 is a protective housing 65. The housing 65 extends the entire length of the auger 60 except for an opening at the rear end on which is mounted a hopper type structure 66. The hopper 66 receives grain from a chute 67 of a grain elevator 68 at the rear end of the crop drier.

Projecting from the rear end of the crop drier is a hopper type structure 70 having an auger type conveyor 71 in its base. The hopper structure may be swung upwardly for purposes of transport. Details of this nature, however, are recognized as being conventional in the art of crop driers and details of the manner of folding are not deemed necessary for purposes of understanding the present invention. It should be understood that the auger 71 may feed grain directly to the elevator 68 for purposes of filling the crop drying chambers, or the auger 49 may be used to feed directly to the elevator 68 for purposes of recirculating the grain in the drying cycle. Suitable mechanism for adjusting the feed from either the auger 71 or the auger 49 to the elevator, while not shown, is provided and is also conventional in driers of this nature.

Power for operating the various operating mechanisms in the crop drier is provided from the forward end of the drier and includes a main drive shaft 80 connectible through suitable drive means to a power take-off shaft, which is not shown, on the tractor. Supported on the drive shaft 80 is a large drive pulley 81 which drives the blower on the furnace 20 through means of a V-belt 82 which rides over a blower pulley 83 which in turn is carried on the blower drive shaft 84. A second pulley, not shown, is also supported on the drive shaft 80 and operates to drive the lower auger drive shaft 86 through means of a V-belt 87 and pulley 88. A V-belt drive, indicated in its entirety by the reference numeral 90, extends between the auger drive shaft 86 and the drive shaft 91 of the left metering wheel 50. A reverse V-belt drive, indicated in its entirety by the reference numeral 92, extends between the drive shaft 91 and the drive shaft 93 of the right metering wheel 51.

The elevator 68 includes at its upper end a transverse shaft 96. Mounted over the shaft 96 is a V-belt drive, indicated in its entirety by the reference numeral 97, which extends downwardly to the upper auger drive shaft 98. The drive shaft 98 is driven from its forward end by a pair of V-belt drives 99, 99a which receive their power from the shaft 93. Again, it should be recognized that the aforesaid driving mechanism, while discussed briefly, is not meant to be a full description of the drive but is discussed only generally and in sufficient manner and only for purposes of fully appreciating the operation of flow of grain in the crop drier.

Positioned in the drier is a series of longitudinal baffles in the upper and lower portions of the crop drying chamber, the upper baffles being represented by the reference numeral 100 and the lower baffles being represented by the reference numeral 101. The baffles 100, 101 are spaced from the inner and outer wall structures 25, 26 and 40, 41. The baffles 100, 101 are constructed of perforated or foraminous plates which are formed in a wedged shape with upper edges 102, 103 in opposed relation to the path of travel of the crops gravitating through the drying chambers.

The structure of the baffles is shown generally in

FIG. 3 and includes therein a main plate portion 105 formed into a wedged shape by having an apron 106 turned downwardly from the plane of the plate. The corner between the apron 106 and the remainder of the blade is sharp and forms the edge 102. Opposite ends of the baffle 100 are flanged at right angles, as at 107, 108, the flanges serving as means enabling connection of the baffle 100 to the ends 13, 14 of the crop drier. The baffle 100 has a series of longitudinally alined perforations 109 formed by downwardly extending louvers which are of such size as to prevent passage of corn but is of sufficient size to permit relatively unrestricted flow of air. The baffles 101 at the lower portion of the crop drier, while not described in detail, are similar in nature to the baffles 100 in the upper portion of the drier, the geometrical differences being obvious.

The crop drying mechanism operates in the following manner. Grain is fed to the hopper and conveyor structure 70, 71 which feeds the grain into the elevator 68 for discharge through the chute 67 into the overhead conveyor or auger 60 which operates as crop inlet means for the drier. The auger conveyor 60 then discharges the grain into the respective left- and right-hand crop drying chambers where the grain gravitates to the lower portion of the drier, and until discharged at the lower end will tend to fill the crop drying chambers. For maximum efficiency of the drier, it is normally desirable to fill the drier to the maximum or to a level indicated in FIG. 2 by a representative line 109. It is required, prior to operating the drier that grain covers the entire plenum chamber. This, of course, is understandable inasmuch as if one portion of the perforated wall of the plenum chamber is left uncovered, the air contained within the plenum chamber will rush through that portion and will not pass through the walls adjacent to the grain. It therefore becomes desirable when filling the crop drier that the plenum chamber be covered as early as possible so that the unit can be put into operation and also in emptying the crop drier that the plenum chamber be covered the maximum length of time.

By providing the baffles or plates 100 to be positioned in an overlying relation to the plenum chamber walls 27, 28 and by causing the grain to be fed from the crop inlet conveyor 60 and between the baffles 100 and the respective diverging walls 27, 28 of the plenum chamber, the grain will first pass under the baffles 100 to fill the bottom of the crop drying chambers and then will fill only the area between the baffles 100 and the respective overlying walls 27, 28 of the plenum chamber to the temporary exclusion of filling the area above the baffles or plates 100. In this manner, the drier will operate satisfactory when the grain reaches a level represented by the line 110 (FIG. 2), since at this level all portions of the plenum chamber have been covered. Consequently, when filling the drier, the drier may be placed in operation at a considerably earlier period of time then is presently contemplated in conventional type driers. Therefore, the baffles or plates 100 divide the upper crop drying chambers into upper and lower areas above and below respectively the baffles 109.

It should also be recognized that in the recirculating type of drier, i.e., when the floor auger 49 feeds the grain to the elevator 68 to again be recirculated in the crop drying chambers, that a considerable quantity of shrinkage occurs in the grain as the moisture is removed. In many instances, shrinkage of this nature will amount to a quantity as high as 20% of the original volume. By placing the baffles 100 in the manner indicated, shrinkage of this nature may occur without effecting the operation of the drier.

In previous types of driers in which the grain is permitted to move from the upper portion to the lower portion by force of gravity, there occurs a normal path in which the grain may move. However, areas within the drying chamber such as where panels or sections are joined at an angle to one another often create areas filled with grain but outside the normal path of flow of the grain. Consequently, grain in these areas remain there and become extremely dry even to the point of scorching. By placing the baffles 100, 101 in the grain drier so that the upper edges 102, 103 are directly in the normal gravitational path of flow of the grain, the grain will be forced to split bi-directionally to opposite sides of the baffles 100, 101. The directions of flow are indicated by the arrows 111 through 119. The purpose of the baffles 100, 101 is therefore not to retard movement of the grain but to cause the grain to move in paths so as to eliminate the dead spots within the crop drying chamber and to move substantially all the grain out of the chamber at an even rate of movement so as to create a uniformly dried crop.

Generally other functions of the crop drier are conventional. The furnace element 20 moves the hot air into the plenum chamber and due to the pressure created by the blower and the furnace, air moves through the perforations of the walls 25, 26 of the plenum chamber, through the perforations in the baffle or plate members 100, 101 and outwardly through the perforations in the outer walls 40, 41. The grain being contained in the crop drying chambers will be dried as the air passes through the chambers. The degree of dryness in the grain may be regulated by the adjustment of the rate of rotation of the measuring rolls 50, 51 and by the amount of recirculation of which it is desired to occur.

While only one form of the invention has been described, it should be recognized that other forms and variations will occur to those skilled in the art. It should therefore be understood that it is not intended to so limit the invention to the specific structure herein described for purposes of fully disclosing the invention nor to limit the invention beyond the broad general terms set forth in the appended claims.

We claim:

1. For use in a crop drier having a central heating area with inner and upright wall structure adjacent to and generally surrounding the heating area with a central apex portion above the heating area and outer and upright wall structure spaced from the inner wall structure and forming with the latter a pair of upright material drying chambers on opposite sides of the heating area, said drying chambers diverging and converging in inclined relation respectively above and below the heating area, said drying chambers having a common upper material inlet means above said central apex portion and lower outlet means effecting a gravitational path of movement of the material through the chambers, the improvement residing in: elongated baffle plates between and spaced from the inner and outer wall structures, said baffle plates defining wedge-shaped structures having edges thereon in opposed relation to the normal gravitational path of movement for bi-directing the material to move in paths on opposite sides of the wedge-shaped structures, at least two of the wedge-shaped structures being positioned above the inner wall structure and on opposite sides of the apex portion whereby said inlet means may fill an area between the latter wedge-shaped structures and inner wall structure prior to filling an area above the latter wedge-shape structures and the outer wall structure.

2. For use in a crop drier having a central heating area with inner and upright wall structure adjacent to and generally surrounding the heating area with a central apex portion above the heating area and outer and upright wall structure spaced from the inner wall structure and forming with the latter a pair of upright material drying chambers on opposite sides of the heating area, said drying chambers diverging in inclined relation above the heating area, said drying chambers having upper material inlet means above the central apex portion and lower outlet means effecting a gravitational path of movement of the material through the chambers, the improvement residing in: a plurality of vertically spaced apart and horizontally disposed elongated baffle plates between and spaced from the inner and outer wall structures, said baffle plates defining wedge-shaped structures having edges thereon in opposed relation to the normal gravitational path of movement for bi-directing the material to move in paths on opposite sides of the wedge-shaped structures, and at least two of the wedge-shaped structures being disposed above the inner wall structure and on opposite sides of the apex portion whereby said inlet means may fill an area between the latter wedge structures and the inner wall structure prior to filling an area above the latter wedge structures and the outer wall structure.

3. For use in a crop drier having a central heating area with inner and upright wall structure adjacent to and generally surrounding the heating area with an apex portion above the heating area and outer and upright wall structure spaced from the inner wall structure and forming with the latter a pair of upright material drying chambers on opposite sides of the heating area, said drying chambers diverging in inclined relation above the heating area, said drying chambers having a common inlet means above the apex portion and outlet means effecting a gravitational path of movement of the material through the chambers, the improvement residing in: a plurality of vertically spaced apart and horizontally disposed elongated plate means between and spaced from the inner and outer wall structure, at least two of the plate means being disposed above the inner wall structure and on opposite sides of the apex portion whereby the inlet means may fill an area between said latter plate means and the inner wall structure to the exclusion of filling an area above said latter plate means and the outer wall structure.

4. For use in a crop drier having a central heating area, a main framework, inner and upright wall structure on the framework generally surrounding the heating area and including a central portion thereof overlying the heating area with downwardly inclined sides extending to opposite sides of the heating area, outer and upright wall structure spaced from the inner wall structure and forming with the latter a pair of upright material drying chambers on opposite sides of the heating area, said drying chambers diverging in inclined relation respectively above the heating area, said drying chambers having centrally located material inlet means above the overlying portion and lower outlet means effecting a gravitational path of movement of the material through the chambers, the improvement residing in: a pair of plate means supported by the framework above the inclined sides of the inner wall structure and between the inner and outer wall structures, said pair of plate means forming in the diverging portions of the crop drying chambers material-receiving upper and lower areas separated by said plate means, said plate means being disposed on opposite sides of said inlet means to define a free access opening between the inlet means and the lower area to permit filling of the lower area to maintain the lower area filled to the exclusion of the upper area, said upper area receiving material in excess to that required to fill the lower area.

5. The invention defined in claim 4 in which the plate means are foraminous to permit relatively unrestricted movement of air through the chamber.

6. A crop drier having means defining a central heating area; a main framework; ;inner and upright wall structure on the framework generally surrounding the heating area, said inner wall structure including a diverging portion overlying the heating area and extending downwardly and outwardly to opposite sides of the heating area, outer and upright wall structure spaced from the inner wall structure, said inner and outer wall structures forming a pair of upright material drying chambers on opposite sides of the heating area, said drying chambers diverging in inclined relation respectively above the heating area, said drying chambers having upper and lower material inlet means and outlet means respectively effecting a gravitational path of movement of the material through the chambers; plate means supported by the framework disposed adjacent to and spaced from the overlying portion of the inner wall structure and forming in the diverging portions of the crop drying chambers upper and lower areas separated by said plate means, said plate means being disposed relative to said inlet means to direct the material toward filling the lower area, said plate means further being composed of a plurality of horizontally disposed plates formed into a plurality of upwardly projecting wedges, said wedges being spaced apart to define a plurality of openings through which material may pass from said upper area to said lower area, the upper edges of said wedges being in opposed relation to the normal gravitational path of movement of the material to effect movement of the material through the openings.

7. A crop drier having means defining a central heating area; a main framework; inner and upright wall structure on the framework generally surrounding the heating area, outer and upright wall structure spaced from the inner wall structure having converging portions underlying the heating area and extending upwardly and outwardly to opposite sides of the heating area, said inner and outer wall structures forming a pair of upright material drying chambers on opposite sides of the heating area including converging and inclined portions thereof below the heating area, said drying chambers having upper and lower material inlet means and outlet means respectively effecting a gravitational path of movement of the material through the chambers; plate means supported by the framework disposed adjacent to and spaced above the converging portion of the outer wall structure and within the converging portions of the drying chambers, said plate means further being composed of a plurality of horizontally disposed plates formed into a plurality of upwardly projecting wedges, said wedges being spaced apart to define a plurality of openings through which material may pass between the wedges, the upper edges of said wedges being in opposed relation to the normal gravitational path of movement of the material to effect movement of the material through the openings.

8. A crop drier having means defining a central heating area; a main framework; inner and upright wall structure on the framework generally surrounding the heating area, said inner wall structure including a diverging portion overlying the heating area and extending downwardly to opposite sides of the heating area, outer and upright wall structure spaced from the inner wall structure having a converging portion underlying the heating area and extending upwardly and outwardly to opposite sides of the heating area, said inner and outer wall structures forming a pair of upright material drying chambers on opposite sides of the heating area, said drying chambers diverging in inclined relation respectively above the heating area and converging in inclined relation respectively below the heating area, said drying chambers having upper and lower material inlet means and outlet means respectively effecting a gravitational path of movement of the material through the chambers; plate means supported by the framework disposed adjacent to and spaced from the diverging portion of the inner wall structure and forming at the diverging portions of the crop drying chambers upper and lower areas separated by said plate means, said plate means being disposed relative to said inlet means to direct the material toward filling the lower area, said plate means further being composed of a plurality of horizontally disposed plates formed into a plurality of upwardly projecting wedges, said wedges being spaced apart to define a plurality of openings through which material may pass from said upper area to said lower area, the upper edges of said wedges being in opposed relation to the normal gravitational path of movement of the material to effect movement of the material through the openings; and plate means supported by the framework disposed adjacent to and spaced above the converging portion of the outer wall structure, said latter plate means being composed of a plurality of horizontally disposed plates formed into a plurality of upwardly projecting wedges, said wedges being spaced apart to define a plurality of openings through which material may pass between the wedges, the upper edges of the latter wedges being in opposed relation to the normal flow of material to effect movement on opposite sides thereof and through the respective openings.

References Cited in the file of this patent

UNITED STATES PATENTS

| | | |
|---|---|---|
| 82,432 | Mills et al. | Sept. 22, 1868 |
| 921,395 | Hager | May 11, 1909 |
| 990,433 | Geiger | Apr. 25, 1911 |
| 1,711,574 | Miller | May 7, 1929 |